Oct. 31, 1950     V. R. PAWELSKY     2,528,169

LIQUID FLOW CONTROL SYSTEM

Filed June 14, 1946

INVENTOR.
VERNON R. PAWELSKY

BY John W. Michael

ATT.

Patented Oct. 31, 1950

2,528,169

UNITED STATES PATENT OFFICE 2,528,169

LIQUID FLOW CONTROL SYSTEM

Vernon R. Pawelsky, Milwaukee, Wis., assignor to Automatic Products Company, Milwaukee, Wis., a corporation of Wisconsin Application June 14, 1946, Serial No. 676,672

6 Claims. (Cl. 158—39)

This invention relates to improvements in shut-off valves to be located between a source of liquid under atmospheric pressure and a device for consuming the liquid.

It is one object of the present invention to provide a positive shut-off valve of simplified construction and which does not require accurate fitting of the valve surfaces and in which a very low amount of shut-off force is required.

Another object of the invention is to provide a shut-off valve in which a trapped body of air serves as the means for shutting off the flow of liquid through the valve.

Another object of the invention is to provide a valve in which a chamber may be moved either to release the flow of liquid through the valve or to trap a body of air beneath the liquid level in the valve for interrupting the flow of liquid through the valve and in which the means for moving the chamber are held in shut-off position until such position is voluntarily changed.

Objects and advantages other than those above set forth will be apparent from the following description when read in connection with the accompanying drawing, in which.

Figure 1:
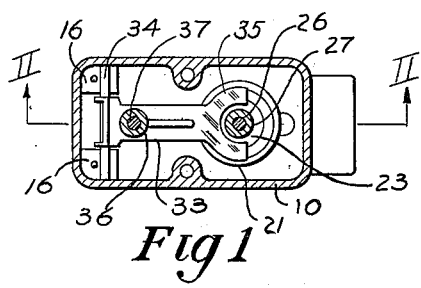
Fig. 1 is a horizontal section of the valve taken on the plane of line I—I of Fig. 2.

Generally, the embodiment of the present invention includes a casing receiving liquid under atmospheric pressure and provided with an outlet tube extending above the bottom of the casing to retain a predetermined quantity of liquid therein. An expansion spring is seated in the casing about the outlet tube and supports a cup in inverted position for trapping a quantity of air above the level of the liquid and conveying such air below the liquid level and holding such air about the upper end of the outlet tube. Such trapped air shuts off the outlet and interrupts flow of liquid from the source to a consuming device. The cup is movable by a pivotally mounted lever resting on the cup and engageable by a push pin against the action of the spring. The relation of the lever and push pin and the push pin mounting are such that the cup is retained in the shut-off position until voluntarily moved therefrom.

Referring particularly to the drawing, 10 designates a valve casing having an inlet passage 11 and an outlet passage 12 with an outlet tube 13 extending above the bottom of a casing for a predetermined distance in the chamber defined by the casing and by a cover 14 closing the open upper end of the casing which is itself provided with a vent 15 for entrance of air into the casing. Projections 16 are formed on the interior wall of the casing and extend into the casing chamber at a location remote from the outlet tube to form supports and bearings for other elements of the structure to be described.

A helical expansion spring 20 seats in the casing about the outlet tube, the spring extending, in its uncompressed condition, a material distance above the end of the outlet tube 13. The spring supports a valve cup, generally designated 21, in inverted position over the end of the outlet tube. The cup is substantially two times the outer diameter of the outlet tube and is formed with a concentric groove 22 in the cup bottom 23 to define an annular area 24 in which the upper end of the spring seats. The side wall 25 of the cup is of such height as to provide a material overlapping of the end of the outlet tube 13 while the bottom of the cup is still above the liquid level. A rod 26 is suitably mounted in and extends upwardly from the bottom of the cup into and is movable through a tubular guide 27 fixed in and depending from the cover 14. The rod and its guide are formed of dissimilar materials not affected by the liquid to be controlled to prevent binding, for any reason, of the rod in its movement in the guide and thereby resisting movement of the cup by the spring.

A lever generally designated 33 is provided with a pivot 34 rotatably seated on or in the casing projections 16 and one end 35 of the lever extends over the cup 21, such end being bifurcated and formed with arcuate portions rocking on the cup bottom. A tubular guide 36 is fixed in and depends from the cover 14 over the lever 33 at a point remote from the lever end 35 resting on the cup and between such end and the lever pivot 34. The guide receives a push pin 37 with a collar 38 adjacent that end of the pin engageable with the lever. The guide 36 and the pin 37 are also formed of dissimilar materials to minimize frictional interference in movement of the pin but the positioning of the lever and the pin relative to the cup are such that the cup will remain in its depressed position until the pin is voluntarily raised to allow the spring to lift the cup.

Figure 2:
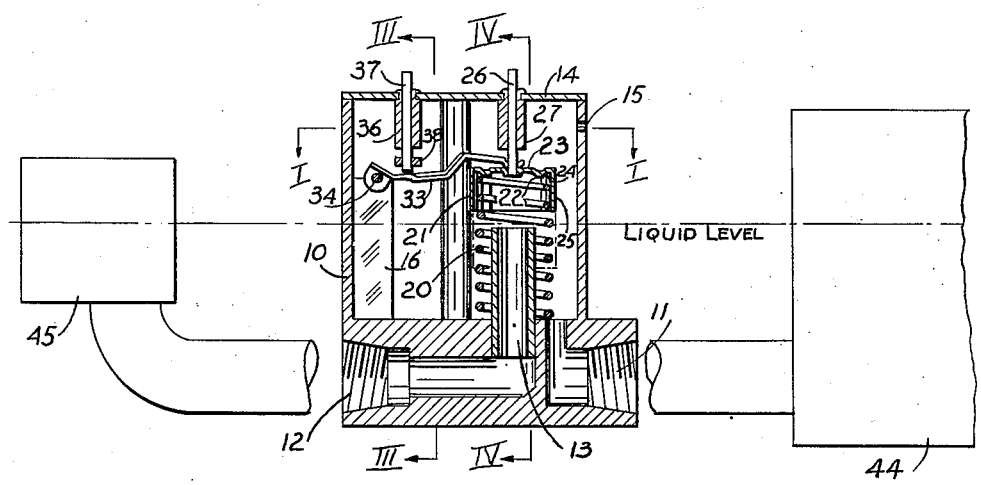
Fig. 2 is a vertical section of the valve taken on the plane of line II—II of Fig. 1 and diagrammatically illustrating the relations of a source of liquid pressure, the valve and a liquid-consuming device.
Figure 3:
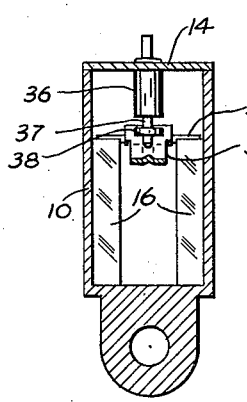
Fig. 3 is a vertical section taken on the plane of line III—III of Fig. 2.
Figure 4:
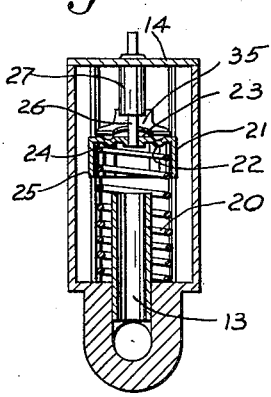
Fig. 4 is a vertical section taken on the plane of the line IV—IV of Fig. 2.

In use, the valve is connected between a source or reservoir of liquid such as oil under atmospheric pressure, indicated at 44, and a liquid-consuming device, such as a burner, indicated at 45. It will be noted that the reservoir, valve, and consuming device are so positioned that the mean liquid level in all three component parts of the system is slightly above the end of the outlet tube 13. So long as flow is desired, the cup 21 is allowed to remain in the raised position and above the liquid level, as shown in Fig. 2, under the free action of the spring 20. When flow is to be shut off, the pin 37 is pressed to swing the lever 33 and the cup 21 downwardly to the dotted line position shown in Fig. 2 against the resistance of the spring 20. Such movement traps air under the cup as soon as the edge of the cup side wall enters the liquid and the trapped body of air prevents further flow of liquid through the outlet 13 and the outlet passage 12 to the device 45. Due to the position and relationship of the lever and the push pin, the cup remains in the dotted line position shown in Fig. 2 until the push pin is again raised, whereupon the spring may lift the cup to the full line position shown in Fig. 2. In such raised position of the cup, the body of air previously trapped thereunder is released, thus avoiding the possibility that some of the air might be absorbed by and carried with the liquid being controlled.

It will be seen that the present structure provides an exceedingly simple device with no accurately fitted parts whatever and employing a trapped body of air for shutting off the flow of liquid from e. g. a barometric reservoir of oil to a sleeve type oil burner. The air chamber is biased toward open position by a spring and is closed by movement of a push pin requiring only a small force and so mounted and acting on a lever in such position that the spring force cannot raise the air chamber when the air chamber has been pressed into its air-trapping position. The binding of the push pin in its guide is sufficient only to resist the action of the spring on the air chamber and lever and does not materially affect the voluntary raising of the pin.

Although but one embodiment of the present invention has been illustrated and described, it will be apparent to those skilled in the art that various changes and modifications may be made therein without departing from the spirit of the invention or from the scope of the appended claims.

I claim:

1. In a liquid flow control system including a source of liquid and a consuming device operatively connected thereto, a shut-off valve included in the connection between said source and said consuming device, said shut-off valve comprising a casing having a liquid inlet connected to said source, and a liquid outlet connected to said consuming device, the upper part of said casing being vented to atmosphere, said liquid source, said casing, and said consuming device being positioned with respect to each other so that a substantially common liquid level exists therein, means for sealing the outlet of the casing against ingress of air from said consuming device including an upstanding tube within the casing having a discharge end connected to the casing outlet and having an inlet end above the casing inlet but below said liquid level within the casing whereby said inlet of the tube is submerged, an inverted cup movably supported over the tube in the air space above the level of liquid in the casing, and means for moving said cup over said tube inlet in sealing relation to the liquid in the casing thereby to provide an air seal preventing liquid flow into the tube, the volume of trapped air in said cup great enough to allow partial evacuation of the tube without breaking the air seal.

2. In a liquid flow control system including a source of liquid and a consuming device operatively connected thereto, a shut-off valve included in the connection between said source and said consuming device, said shut-off valve comprising a casing having a liquid inlet connected to said source, and a liquid outlet connected to said consuming device, the upper part of said casing being vented to atmosphere, said liquid source, said casing, and said consuming device being positioned with respect to each other so that a substantially common liquid level exists therein, means for sealing the outlet of the casing against ingress of air from said consuming device including an upstanding tube within the casing having a discharge end connected to the casing outlet and having an inlet end above the casing inlet but below said liquid level within the casing whereby said inlet of the tube is submerged, an inverted cup movably supported over the tube in the air space above the level of liquid in the casing, and means for moving said cup over said tube inlet in sealing relation to the liquid in the casing thereby to provide an air seal preventing liquid flow into the tube, the volume of trapped air in said cup being great enough to allow partial evacuation of the tube without breaking the air seal.

3. In a liquid flow control system including a source of liquid and a consuming device operatively connected thereto, a shut-off valve included in the connection between said source and said consuming device, said shut off valve comprising a casing having a liquid inlet connected to said source, and a liquid outlet connected to said consuming device, the upper part of said casing being vented to atmosphere, said liquid source, said casing, and said consuming device being positioned with respect to each other so that a substantially common liquid level exists therein, means for sealing the outlet of the casing against ingress of air from said consuming device including an upstanding tube within the casing having a discharge end connected to the casing outlet and having an inlet end above the casing inlet but below said liquid level within the casing whereby said inlet of the tube is submerged, a cup supported in inverted position above the level of liquid in the casing, means operable from exteriorly of the casing for moving the cup to a position surrounding the inlet end of the tube with its lower edge sealed by the liquid in said casing, thereby to trap a body of air about the end of the tube to interrupt flow from the casing, and means guiding movement of the cup by the first said means.

4. In a liquid flow control system including a source of liquid and a consuming device operatively connected thereto, a shut-off valve included in the connection between said source and said consuming device, said shut off valve comprising a casing having a liquid inlet connected to said source, and a liquid outlet connected to said consuming device, the upper part of said casing being vented to atmosphere, said liquid source, said casing, and said consuming device being positioned with respect to each other so that a substantially common liquid level exists therein, means for sealing the outlet of the casing against ingress of air from said consuming device including an upstanding tube within the casing having a discharge end connected to the casing outlet and having an inlet end above the casing inlet but below said liquid level within the casing whereby said inlet of the tube is submerged, a spring seated in the casing about said tube, an inverted cup supported on the spring above the upper end of the tube, a lever pivotally mounted in the casing and engaging with the cup, a guide extending through the casing over the lever, and a pin movable in the guide to press on the lever to move the cup to convey and hold a body of air about the inlet end of the tube to interrupt flow from the casing, the guide and pin holding the lever in its depressed position until voluntary raising of the pin.

5. In a liquid flow control system including a source of liquid and a consuming device operatively connected thereto, a shut-off valve included in the connection between said source and said consuming device, said shut off valve comprising a casing having a liquid inlet connected to said source, and a liquid outlet connected to said consuming device, the upper part of said casing being vented to atmosphere, said liquid source, said casing, and said consuming device being positioned with respect to each other so that a substantially common liquid level exists therein, means for sealing the outlet of the casing against ingress of air from said consuming device including an upstanding tube within the casing having a discharge end connected to the casing outlet and having an inlet end above the casing inlet but below said liquid level within the casing whereby said inlet of the tube is submerged, a spring seated in the casing around the tube, an inverted cup supported on the spring above the upper end of the tube, a lever pivotally mounted in the casing and engaging the cup, a guide extending through the casing over the lever, a pin movable in the guide to press on the lever to move the cup to convey and hold a body of air about the inlet end of the tube to interrupt flow from the casing, the guide and pin holding the lever in its depressed position until voluntary raising of the pin, and means for guiding movement of the cup by the spring and the lever.

6. In a liquid flow control system including a source of liquid and a consuming device operatively connected thereto, a shut-off valve included in the connection between said source and said consuming device, said shut off valve comprising a casing having a liquid inlet connected to said source, and a liquid outlet connected to said consuming device, the upper part of said casing being vented to atmosphere, said liquid source, said casing, and said consuming device being positioned with respect to each other so that a substantially common liquid level exists therein, means for sealing the outlet of the casing against ingress of air from said consuming device including an upstanding tube within the casing having a discharge end connected to the casing outlet and having an inlet end above the casing inlet but below said liquid level within the casing whereby said inlet of the tube is submerged, a spring seated in the casing around the tube, an inverted cup supported on the spring above the upper end of the tube, a lever pivotally mounted in the casing and engaging the cup, a guide extending through the casing remote from the cup and over the lever, a pin movable in the guide to press on the lever and move the cup to convey and hold a body of air about the inlet of the tube, the guide and pin holding the lever in its depressed position until voluntary raising of the pin, a second guide extending into the casing and substantially axially of the tube and a rod fixed on the cup and extending into the second guide for guiding movement of the cup by the spring and lever.

VERNON R. PAWELSKY.

REFERENCES CITED

The following references are of record in the file of this patent:

UNITED STATES PATENTS

| Number | Name | Date |
| --- | --- | --- |
| 400,333 | Haberthur | Mar. 26, 1889 |
| 618,913 | Smith | Feb. 7, 1899 |
| 960,912 | Heany | June 7, 1910 |
| 1,693,945 | Wildern | Dec. 4, 1928 |
| 1,912,014 | Sherman | May 30, 1933 |

FOREIGN PATENTS

| Number | Country | Date |
| --- | --- | --- |
| 2,529 | Great Britain | of 1857 |
| 580,836 | France | of 1924 |